United States Patent
Xhafa et al.

(10) Patent No.: US 8,456,358 B2
(45) Date of Patent: Jun. 4, 2013

(54) METHOD FOR GNSS COEXISTENCE

(75) Inventors: Ariton E. Xhafa, Plano, TX (US); Deric Wayne Waters, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/306,038

(22) Filed: Nov. 29, 2011

(65) Prior Publication Data

US 2012/0068883 A1  Mar. 22, 2012

Related U.S. Application Data

(62) Division of application No. 12/394,404, filed on Feb. 27, 2009, now Pat. No. 8,154,443.

(60) Provisional application No. 61/035,097, filed on Mar. 10, 2008.

(51) Int. Cl.
*G01S 19/21* (2010.01)
(52) U.S. Cl.
USPC .................................................... 342/357.59

(58) Field of Classification Search
USPC  342/357.4, 357.46, 357.48, 357.59; 701/408, 701/468
See application file for complete search history.

(56) References Cited

U.S. PATENT DOCUMENTS

| 5,822,429 A * | 10/1998 | Casabona et al. | 380/252 |
| 6,107,960 A * | 8/2000 | Krasner | 342/357.59 |
| 7,796,560 B2 * | 9/2010 | Rousu et al. | 370/333 |

* cited by examiner

*Primary Examiner* — Dao Phan
(74) *Attorney, Agent, or Firm* — Steven A. Shaw; W. James Brady; Frederick J. Telecky, Jr.

(57) ABSTRACT

A method for operating a wireless transmitter and a global navigation satellite ("GNSS") receiver coexistent in a mobile wireless device. A mobile wireless device includes a GNSS receiver and a wireless networking system. The wireless networking system includes a wireless transmitter. The wireless transmitter provides a first interference level signal to the GNSS receiver. The first interference level signal indicates a level of interference that the GNSS receiver can expect due to operation of the transmitter. A priority signal is asserted if the processing of navigation signals in the GNSS receiver takes precedence over wireless transmitter transmissions.

6 Claims, 4 Drawing Sheets

METHOD FOR GNSS COEXISTENCE

This application is a Divisional of and claims priority to U.S. patent Ser. No. 12/394,404 filed on Feb. 27, 2009 which claims priority to provisional patent application 61/035,097, filed on Mar. 10, 2008, entitled "Method and System for GNSS Coexistence." Said applications herein incorporated by reference

BACKGROUND

As wireless technologies proliferate, mobile wireless devices incorporate a multiplicity of different wireless standards. For example, a cellular telephone can accommodate a cellular network (e.g., Universal Mobile Telecommunications System), a local area network, such as IEEE 802.11, and a personal area network (e.g., Bluetooth).

Some mobile devices also utilize receive only networks, such as one or more of the global navigation satellite systems ("GNSS"). Examples of GNSS include the Global Positioning System ("GPS"), the GLObal Navigation Satellite System (GLONASS), the Galileo system, the Quazi-Zenith Satellite System (QZSS), and Beidou. GNSS enabled devices can use the navigation system to provide directions or location information while the device simultaneously accesses one or more wireless networks, for example, to receive a voice call via a cellular network and/or to utilize a Bluetooth headset. Unfortunately, wireless network access can interfere with GNSS signal reception.

SUMMARY

Various systems and methods for simultaneously utilizing a plurality of wireless networks colocated in a wireless device are disclosed herein. In accordance with at least some embodiments, a mobile wireless device includes a global navigation satellite system ("GNSS") receiver and a wireless networking system. The wireless networking system includes a wireless transmitter. The wireless transmitter provides a first interference level signal to the GNSS receiver. The first interference level signal indicates a level of interference that the GNSS receiver can expect due to operation of the transmitter.

In accordance with at least some other embodiments, a method includes determining whether a wireless transmitter in a mobile wireless device has data to transmit. If the wireless transmitter has data to transmit, then a first interference level signal is asserted by the wireless transmitter. The first interference level signal is provided to a GNSS receiver in the mobile wireless device. Processing of navigation signals in the GNSS receiver is controlled based, at least in part, on the assertion of the first interference level signal by the wireless transmitter. The location of the mobile wireless device is determined based on the navigation signal processing.

In accordance with yet other embodiments, a mobile wireless device includes a GNSS receiver that notifies a wireless transmitter colocated in the mobile wireless device when reception of navigation signals by the GNSS receiver should take priority over transmissions by the wireless transmitter.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
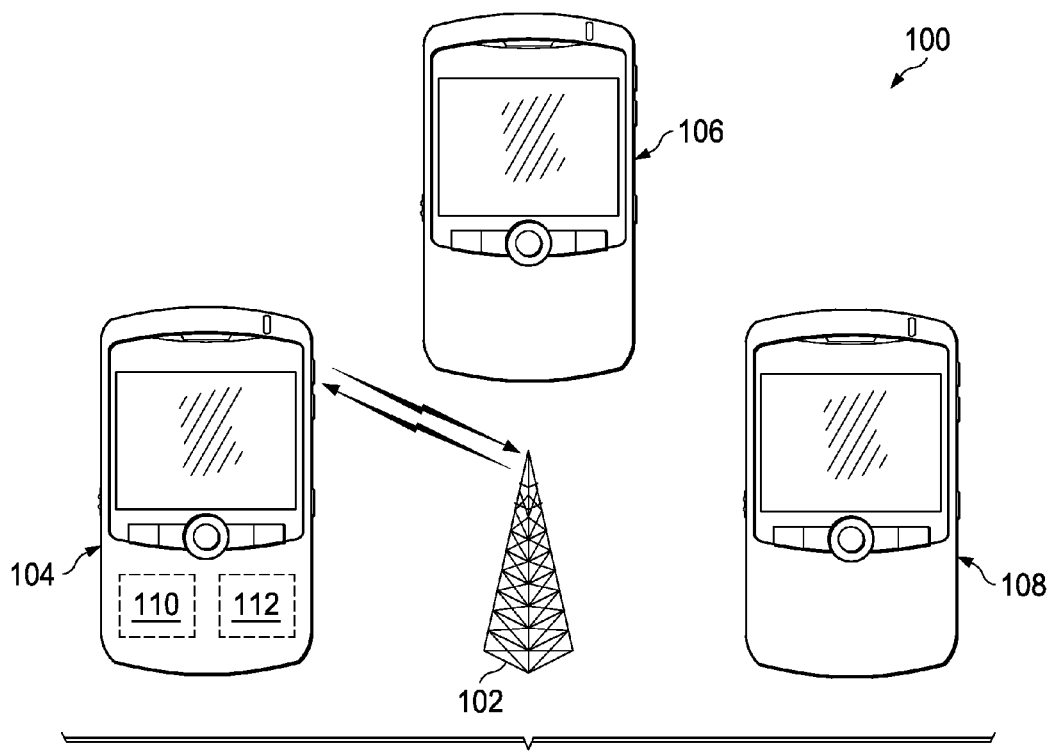
FIG. 1 shows an exemplary wireless network in accordance with various embodiments.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. Further, the term "software" includes any executable code capable of running on a processor, regardless of the media used to store the software. Thus, code stored in memory (e.g., non-volatile memory), and sometimes referred to as "embedded firmware," is included within the definition of software.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Disclosed herein are a system and method for operating a global navigation satellite system ("GNSS") receiver and another wireless technology colocated (i.e., located together) in a mobile wireless device. While access to multiple wireless networks and systems provides a number of benefits, interference between different technologies can make simultaneous operation of different wireless technologies colocated in a mobile device problematic. For example, out of band emissions by one technology can saturate the receiver of another technology. Moreover, strong signals can create reliability issues in low noise amplifiers. Rejection filter designs may have to provide 40-55 dB of attenuation or more, which is difficult in practice. Embodiments of the present disclosure allow a GNSS system to coexist in a mobile wireless device with one or more other wireless networking technologies, such as WiMAX (IEEE 802.16), WLAN (IEEE 802.11), long-term evolution ("LTE") networks, wireless USB, Bluetooth, etc. Embodiments include inter-technology signaling mechanisms that allow a GNSS system to identify and/or control periods of possible interference by other technologies. Having identified a period of potential interference, the GNSS system can mitigate the effects of the interference to provide reliable navigation.

FIG. 1 shows an exemplary wireless network 100 in accordance with various embodiments. The wireless network 100 includes an access point 102, and a mobile wireless device 104. As illustrated, the wireless network 100 also optionally includes mobile wireless devices 106 and 108. In practice, a wireless network may include one or more mobile wireless devices. The wireless mobile device 104 transmits data to and receives data from the access point 102. The access point 102 can also be referred to as a base station, a node B, etc. Some embodiments of the wireless network 100 can employ ad-hoc networking, and may not include the access point 102. Instead, the mobile wireless devices 104, 106, 108 communicate directly with one another. Exemplary mobile wireless devices include cellular telephones, personal digital assistants, personal computers, navigation devices, etc.

The mobile wireless device 104 includes a GNSS system 110 for determining the location of the device 104. The GNSS system 110 can operate on GPS, GLONASS, or any other positioning system. Some embodiments of the mobile wireless receiver 104 can include a plurality of GNSS systems 110, each operating on different positioning networks. The mobile wireless device 104 also includes a wireless networking system 112, which can be, for example, an IEEE 802.11 wireless LAN, WiMAX, Bluetooth, a cellular technology such as LTE, etc. The wireless networking system 112 includes a transmitter that when active can produce out of band emissions that interfere with reception of navigation signals provided by a navigation transmitter, such as a positioning satellite. In some embodiments, the mobile wireless device 104 can include multiple wireless networking systems 112, at least one of which can operate concurrently with the GNSS system 110. Embodiments encompass all combinations of GNSS systems 110 and wireless networking systems 112 colocated in a mobile wireless device 104.

Embodiments of the GNSS receiver 110 and the wireless networking system 112 included in the mobile wireless device 104 provide communication signals passing between the GNSS system 110 and the wireless networking system 112 that inform the GNSS system 110 of time intervals when interference is likely. Some embodiments also provide signals from the GNSS system 110 to the wireless networking system 112 that inform the wireless networking system 112 of intervals when the GNSS system 110 desires reduced interference. The GNSS system 110 and the wireless networking system 112 thus coordinate operations to reduce interference to navigation signal reception, and provide improved GNSS system 110 performance.

Figure 2:
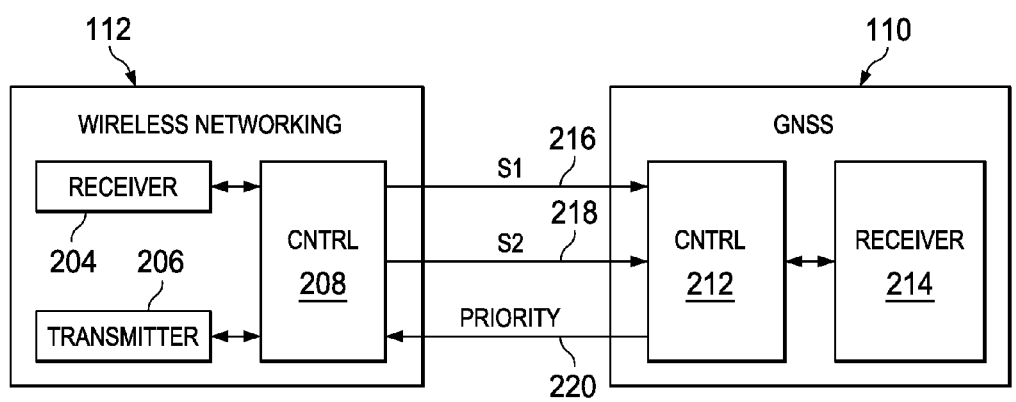
FIG. 2 shows a block diagram of a global navigation satellite ("GNSS") receiver and a wireless networking system colocated in a mobile wireless device in accordance with various embodiments.

FIG. 2 shows a block diagram of a GNSS system 110 and a wireless networking system 112 colocated in a mobile wireless device 104 in accordance with various embodiments. The wireless networking system 112 includes a transmitter 206, a receiver 204 and a controller 208. The transmitter 206 transmits signals over the wireless network, and the receiver 204 receives signals transmitted over the wireless network. The transmitter 206 and the receiver 204 include a variety of components that are not shown, for example, modulator/demodulator, encoder/decoder, amplifiers, filters, etc.

The receiver 204 and the transmitter 206 exchange information and control with the controller 208. In some embodiments, the controller 208 can be integrated into the receiver 204 and/or the transmitter 206. In some embodiments, the controller 208 may be separate from the receiver 204 and/or the transmitter 206. The controller 208 receives information from the transmitter 206, such as notification of transmitter activity and/or expected transmitter activity and provides transmitter activity information to the GNSS system 110. In some embodiments, transmitter activity state information may include, for example, transmitter active, transmitter inactive, and transmission pending.

Similarly, the controller 208 receives information from the receiver 204, such as notification of signal detection and provides receiver activity information to the GNSS system 110. The controller 208 can also provide information, such as a request for reduced interference, to the transmitter 206.

The GNSS system 110 includes a GNSS receiver 214 and a controller 212. The GNSS receiver 214 receives and processes navigation signals to determine a location of the mobile wireless device 104. The GNSS receiver 214 provides information to and receives control from the controller 212. The GNSS receiver 214 may, for example, notify the controller 212 when the GNSS receiver 214 desires improved navigation signal fidelity, or when reduced navigation signal fidelity is allowable. The controller 212 may provide the GNSS receiver 214 with information indicating an expected level of interference by the wireless network, based, for example, on information received from the wireless networking system 112.

The GNSS system 110 and the wireless networking system 112 communicate with each other to provide control over wireless network (e.g., transmitter 204) interference with GNSS navigation signal reception. The illustrated embodiment includes a first signal "S1" 216, a second signal "S2" 218, and a priority signal 220. Note that in embodiments including multiple wireless networking systems 112 and/or multiple GNSS systems 110, each wireless networking system 112 can provide a separate set of control signals to each GNSS system 110 to facilitate operation when each GNSS system 110 and/or each wireless networking system 112 operates in a different frequency band.

The wireless networking system 112 can assert the signals S1 216 and S2 218 to indicate a level of interference that the GNSS system 110 can expect due transmissions on the wireless network 100. In some embodiments, the signal S1 216 can indicate that the transmitter 206, colocated with the GNSS system 110 is active and transmitting data via the wireless network. In some embodiments, the signal S2 218 can indicate that the network receiver 204 is active (i.e., processing a detected transmission), or that either the network receiver 204 is active or another network device (e.g., access point 102) is transmitting.

In some embodiments, the signals S1 216 and S2 218 can provide more detailed information about interference levels than is described above. For example, the signal S1 216 can indicate the power applied by the transmitter 206 during transmission, and the signal S2 218 can indicate a signal-to-noise ratio measurement of over-the-air transmissions to indicate the amount of interference the GNSS system 110 can expect.

The GNSS system 110 can apply the information provided in the S1 216 and/or S2 218 signals in a variety of ways. Embodiments can employ the information to mitigate the effects of navigation processing on receiver 204 signal reception, or to mitigate the effects of network 100 interference on navigation signal reception. In some embodiments, when the signals S1 216 and/or S2 218 indicate that the wireless network 100 is causing little or no interference, then the GNSS system 110 can process navigation signals continuously and without any special interference mitigation. In some embodiments, when the signals S1 216 and/or S2 218 indicate some level of interference the GNSS system 110 can either process the satellite signals normally, or not process the satellite signals during the time of interference, or use an interference mitigation technique during the time of interference. For example, for navigation signals that use a spread spectrum type of signal design (e.g., code-division multiple access ("CDMA")), if the frequency interference is limited to only a portion of the signal bandwidth then a filter can be used to remove the interference and the GNSS system 110 can process the remainder of the signal spectrum normally—albeit with a lower signal-to-noise ratio ("SNR").

In an embodiment wherein the network 100 is, for example, a wireless local area network ("WLAN"), packets transmitted over the network 100 are broadcast packets, and therefore the packets are received by all wireless devices in the network including the wireless networking system 112. The wireless networking system 112 can assert an S2 218 signal to the GNSS system 110 regardless of whether a packet transmitted by a different mobile wireless device 106, 108 or the access point 102 is destined for the device 104. If a transmitted packet is destined for the device 104, the wireless networking system 112 will preferably assert the signal S1 216 to the GNSS system 110 only if an acknowledgment or other responsive packet is to be transmitted by the transmitter 206. In other words, the signal S1 216 may be asserted only when the wireless networking system 112 colocated with the GNSS system 110 will be transmitting.

In such an embodiment, the GNSS system 110 can receive navigation signals for a time duration indicated in the transmitted WLAN packet (e.g., in the PHY preamble). If the transmitted WLAN packet is not destined for the wireless networking system 112, then, the time duration during which the GNSS system 110 can receive navigation signals can be adjusted, for example, based on a network allocation vector ("NAV") read from the packet.

Figure 3A:
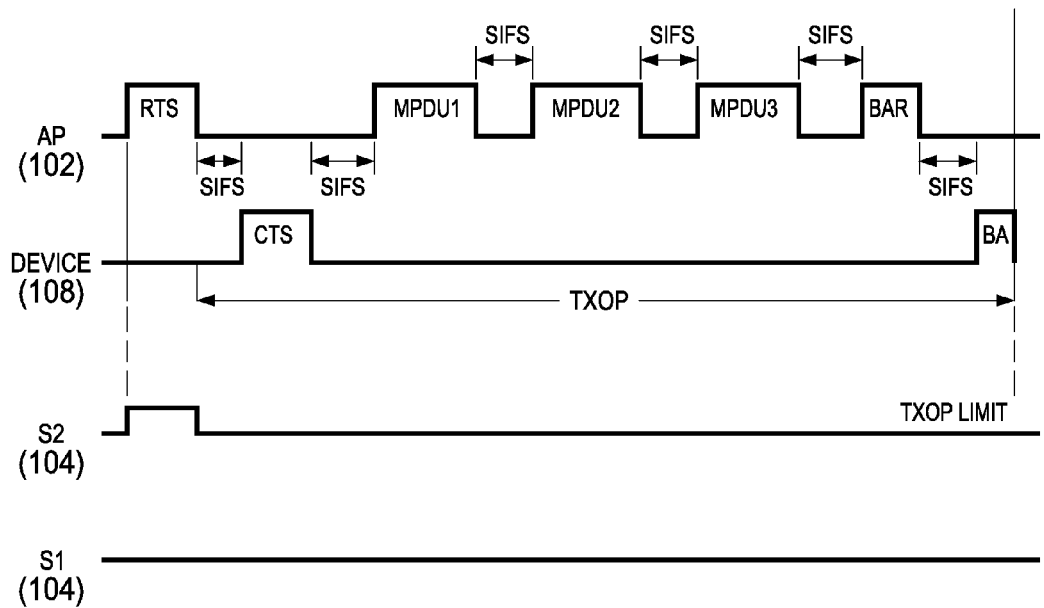
FIGS. 3A and 3B show signal diagrams of exemplary network transmission sequences and resulting GNSS system control signals in accordance with various embodiments.

FIG. 3A illustrates an example where the access point 102 is transmitting to a mobile wireless device other than the device 104, for example transmitting to the wireless mobile device 108. The access point 102 first transmits a request to send ("RTS"). The device 104 detects the RTS and asserts signal S2 218 for the duration of the RTS. When the receiver 204 decodes the RTS packet and determines that the transmission is not destined for the mobile wireless device 104, the S2 signal 218 can be negated. The signal S1 216 is negated throughout the illustrated sequence because the device 104 is not transmitting.

Figure 3B:
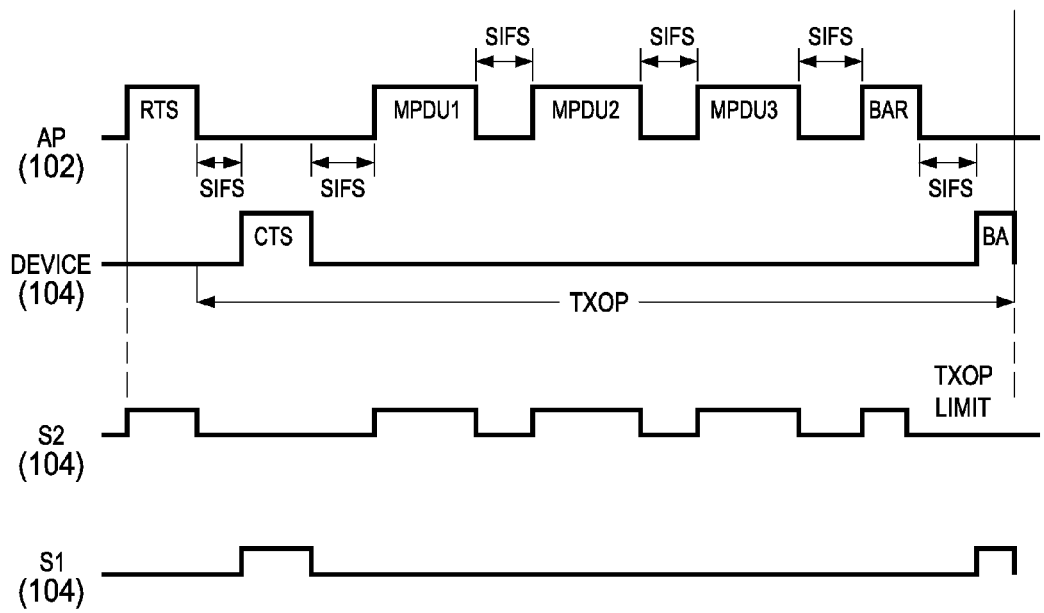

FIG. 3B illustrates an example where the access point 102 is transmitting to the mobile wireless device 104. The access point 102 first transmits an RTS. The device 104 detects the RTS and asserts signal S2 218 for the duration of the RTS. The device 104 decodes the RTS packet and determines that the transmission is destined for the device 104. The device 104 transmits a clear to send ("CTS") packet a short inter-frame space ("SIFS") interval after the RTS. The S1 signal 216 is asserted during the CTS transmission. The access point 102 then transmits a series of media access control protocol data units ("MPDUs"). As each MPDU is processed by the receiver 204, the wireless networking system 112 asserts S2 218. Similarly, S2 218 is asserted during reception of the block acknowledge request ("BAR"). Following BAR reception, S1 216 is asserted during transmission of the block acknowledge ("BA").

In some embodiments, the SIFS intervals may not be considered. In such embodiments, when the receiver 204 decodes the RTS packet, the NAV can be read from the RTS packet, and the signal S2 218 extended by the time indicated in the NAV (i.e., for the duration of TXOP).

In an embodiment wherein the wireless networking system 112 is a Bluetooth system, voice over internet protocol ("VOIP") traffic is periodic with active intervals of 1.25 milliseconds ("ms") and inactive intervals of 2.5 ms. Thus, an embodiment may assert S1 216 for a period of 1.25 ms and assert S2 218 for a period of 2.5 ms. The time period of S1 216 assertion can be further reduced to 0.625 ms. For other types of traffic (i.e., non-VOIP traffic), the duration of S1 216 and S2 218 signals will depend on the characteristics of the traffic.

In an embodiment wherein the wireless networking system 112 is a WiMAX system, when the mobile wireless device 104 has data to transmit via the wireless networking system 112, the S1 216 signal can be asserted for the duration of the transmission. Generally, the transmit duration is no more than a few milliseconds.

Similarly, other wireless technologies, that may be either time or frequency division duplexed, such as LTE or Global System for Mobile Communications ("GSM"), that discontinuously transmit can coexist with the GNSS system 110 as described above. As long as the communication between network stations, for example mobile wireless device 104 and access point 102 includes non-transmission intervals, the signals S1 216 and/or S2 218 can be used to facilitate coexistence.

Referring again to FIG. 2, the GNSS system 110 provides a signal Priority 220 to the wireless networking system 112. In some embodiments, the Priority 220 signal can notify the wireless networking system 112 that the GNSS system 110 desires reduction of interference. The GNSS system 110 may need reduced interference when, for example, the received navigation signals are weak, such as when obstructed by buildings or other topographic features. The Priority 220 signal notification can cause the wireless networking system 112 to change its behavior, for example, to transmit at a lower power level, thus reducing interference.

Similarly, the GNSS system 110 may use the Priority 220 signal to notify the wireless networking system 112 that the system 112 need not modify its behavior to reduce interference. For example, if the GNSS system is providing route guidance to a driver, and the next turn is many miles away, the GNSS system 110 may not need to continuously receive and process navigation signals.

Various components of the wireless networking system 112 and the GNSS system 110, including at least some portions of the receiver 204, the transmitter 206, the controller 208, the receiver 214 and the controller 212 can be implemented using a processor and software programming that causes the processor to perform the operations described herein. In particular, software programming can cause a processor to provide interference indications S1 216 and/or S2 218 to the GNSS system 110 and priority indications 220 to the wireless networking system 112, and attendant transmission and navigation processing behavior changes as described herein. Suitable processors include, for example, general-purpose processors, digital signal processors, and microcontrollers. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems. Software programming can be stored in a computer readable medium. Exemplary computer readable media include semiconductor memory, optical storage, and magnetic storage.

Some embodiments can implement the functionality described herein using dedicated circuitry. Some embodiments may use a combination of dedicated circuitry and software executed on a processor. Selection of a hardware or software implementation is a design choice based on a variety of factors, such as cost and the ability to incorporate changed or additional functionality in the future.

In at least some embodiments, the wireless networking system 112 and the GNSS system 110 may share some hardware resources, such that at least some parts of the systems 110, 112 may not operate concurrently. In such embodiments, the S1 216, and/or S2 218, and/or Priority 220 signals may be inputs to arbitration logic (i.e., an arbiter) that determines which system can use the shared resource. The arbiter can provide signals to the systems 110, 112 and/or the shared resource indicating to which system 110, 112 the resource is allocated. For example, if the GNSS system 220 asserts the Priority 220 signal, a shared resource may be allocated to the GNSS system 220. In at least some embodiments, the arbiter can be included in controller 208 and/or controller 212.

In an exemplary embodiment, the wireless network receiver 204 uses a technology similar to that used by the GNSS receiver 214. This can occur, for example, if the wireless network 100 and the navigation signal source (e.g., a navigation satellite) transmit CDMA signals. A GNSS receiver 214 can include a plurality of correlators to enable fast processing of the CDMA signals transmitted by a GNSS satellite. When the wireless network 100 is active (e.g., S2 is asserted), then at least some of correlators of the GNSS receiver 214 can be allocated to the wireless network receiver 204. Even in embodiments wherein the GNSS system 110 and the wireless networking system 112 are not based on the same technology (e.g., both are not CDMA based), the mobile wireless device 104 can benefit from sharing a hardware resource across colocated transmitters and/or receivers, for example, to reduce hardware costs.

Figure 4:
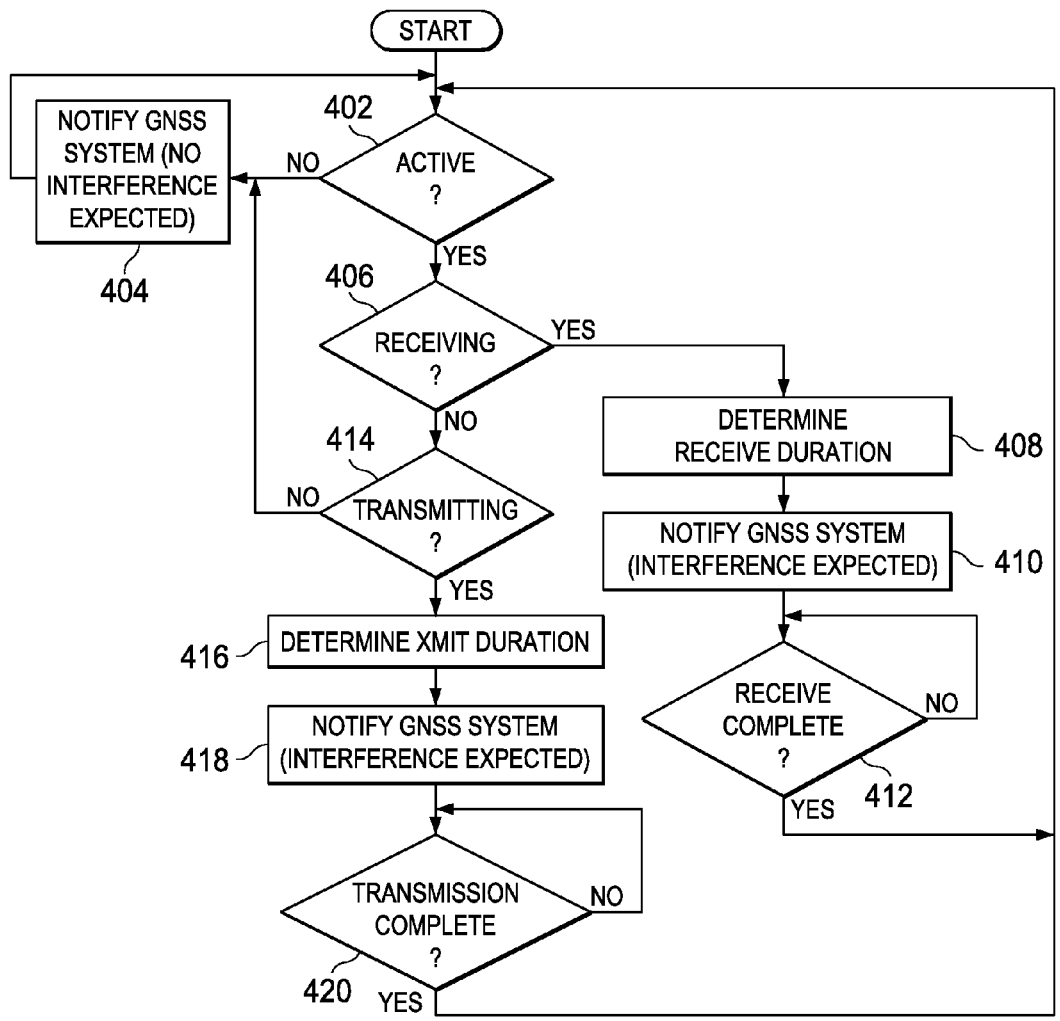
FIG. 4 shows a flow diagram for a method for providing GNSS system control signals in accordance with various embodiments.

FIG. 4 shows a flow diagram for a method for providing GNSS system 110 control signals in accordance with various embodiments. Though depicted sequentially as a matter of convenience, at least some of the actions shown can be performed in a different order and/or performed in parallel. Additionally, some embodiments may perform only some of the actions shown. In some embodiments, the operations of FIG. 4, as well as other operations described herein, can be implemented as instructions stored in a computer readable medium and executed by a processor.

In block 402, a mobile wireless device 104 including a GNSS system 110 and a wireless networking system 112 is operating. If the network 100 is inactive (i.e., no signals are being transmitted over the network), then in block 404, the wireless networking system 112 notifies the GNSS system 112 that no interference from the network should be expected. In some embodiments, the wireless networking system 110 can assert the S2 218 signal to perform such notification. When no interference is expected the GNSS receiver 110 can process received navigation signals continuously and without interference mitigation.

If, in block 402, the network 100 is active (i.e., data is being transmitted), the wireless networking system 112 checks, in block 406, for reception of signals transmitted by other network devices 102, 106, 108. If another device 102, 106, 108 is transmitting, then, in block 408, the wireless networking system 112 determines the duration of the transmission. In some embodiments of the network 100, some transmissions may be of fixed duration and/or the duration of some transmissions may be defined in a transmitted packet. In block 410, the wireless networking system 112 notifies the GNSS system 110 of an interference level that can be expected during the transmission. In some embodiments, no interference may be indicated when other devices 102, 106, 108 are transmitting but the device 104 is not transmitting. In other embodiments, some level of interference may be indicated based on, for example, the frequency band and/or power level of the received signal. When little or no interference is expected the GNSS receiver 110 can process received navigation signals continuously and without interference mitigation.

In block 412, the wireless networking system 112 determines whether the transmission detected in block 406 is complete. If the transmission is complete, the method continues in block 402, otherwise the method continues to check for transmission completion in block 412.

If, in block 406, the wireless networking system 112 is not receiving a signal (i.e., no signal is being transmitted by another device 102, 106, 108), then in block 414, the wireless networking system 112 determines whether the transmitter 206 is transmitting. If the transmitter 206 is idle, then in block 404, the wireless networking system 112 informs the GNSS system 110 that no interference is expected.

If, in block 414, the transmitter 204 is active, then, in block 416, the wireless networking system 112 determines the duration of the transmission. The GNSS system 110 is notified, in block 418, of the level of interference the transmission is expected to present to reception of navigation signals. In some embodiments, the notification may simply indicate that the transmitter 206 is active. In some embodiments, the notification may be based on transmitter 206 output power and/or transmit frequency bands, and/or other measurements of transmission interference with navigation signals. The GNSS system 110 can ignore the notification, and/or discontinue navigation signal processing, and/or implement interference mitigation measures such as filtering in various embodiments in accordance with the anticipated interference level and the capabilities of the GNSS system 110.

In block 420, the wireless networking system 112 determines whether the transmission detected in block 414 is complete. If the transmission is complete, the method continues in block 402, otherwise the method continues to check for transmission completion in block 420.

Figure 5:
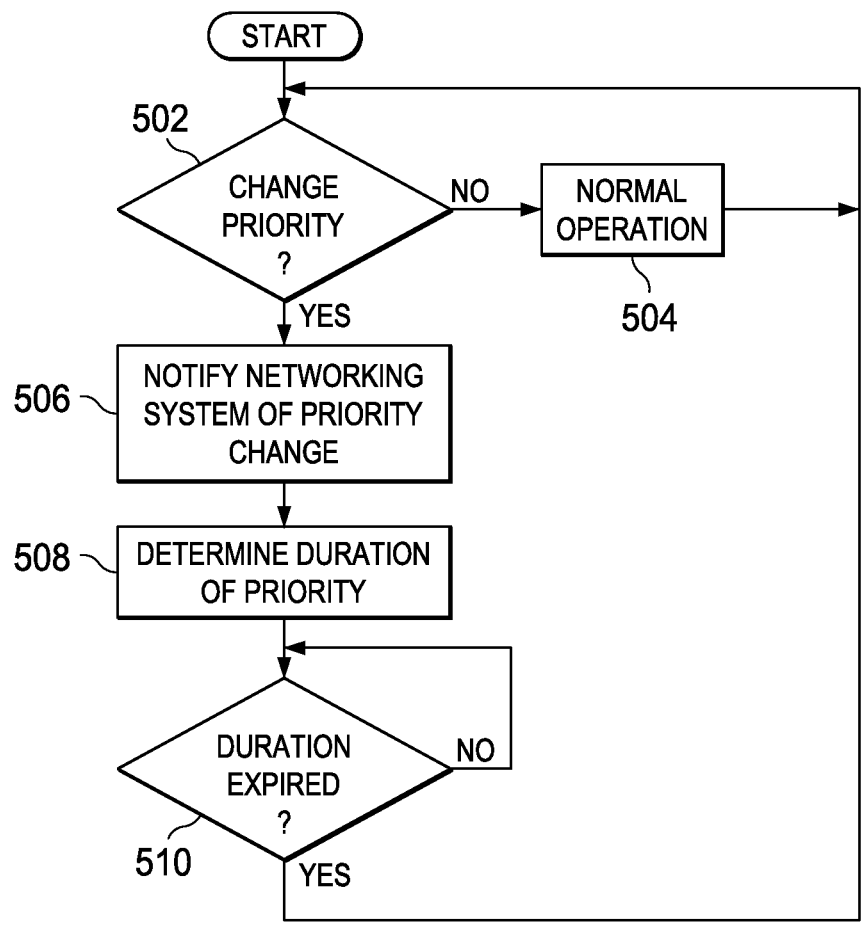
FIG. 5 shows a flow diagram for a method for providing wireless networking system transmitter control signals in accordance with various embodiments.

FIG. 5 shows a flow diagram for a method for providing wireless networking system transmitter 206 control signals in accordance with various embodiments. Though depicted sequentially as a matter of convenience, at least some of the actions shown can be performed in a different order and/or performed in parallel. Additionally, some embodiments may perform only some of the actions shown. In some embodiments, the operations of FIG. 5, as well as other operations described herein, can be implemented as instructions stored in a computer readable medium and executed by a processor.

In block 502, the GNSS system 110 is operating, for example receiving and processing navigation signals. The GNSS system 110 determines whether a change in priority is desirable. For example if the GNSS system 110 determines that an increase in the signal-to-noise ratio ("SNR") of received navigation signals is desirable, then the GNSS system can raise its priority. In some embodiments, the GNSS system 110 can determine that a lower navigation signal SNR can be tolerated and lower GNSS system 110 priority accordingly. If the GNSS system 110 determines that no change in priority is indicated, then GNSS system 110 and wireless networking system 112 operations continue unchanged in block 504.

If, in block 502, a priority change is indicated, then, in block 506, the wireless networking system 112 is notified of the change in GNSS system 110 priority. If the priority change raises GNSS system 110 priority, then the wireless networking system 112 can act to reduce interference with the GNSS system 110 by, for example, reducing transmitter power output, increasing inter-transmission intervals, etc. If the priority change lowers GNSS system 110 priority, then the wireless networking system 112 can, for example, operate without regard for the GNSS system 110.

In block 508, the GNSS system 110 determines a duration for the changed priority. The duration may be based on, for example, an estimated time for determining a reliable position estimate, or time until a next position estimate of a specified accuracy is needed.

In block 510, the GNSS system 112 determines whether the priority change duration has expired. If the duration has expired, the method continues in block 502, otherwise the method continues to check for expiration of the changed priority duration in block 510.

Table 1 below illustrates exemplary operation of the wireless networking system 112 and the GNSS system 110 using the S1 216 signal, the S2 218 signal, and the priority 220 signal. In this exemplary embodiment the signals 216, 218, 220 are illustrated as indicating binary states. Thus, S1 216 indicates transmitter 206 active or inactive, S2 218 indicates whether or not the receiver 204 is detecting transmitted signal, and priority 220 indicates whether of not the GNSS system 110 has priority.

TABLE 1

| Scenario | S2 | S1 | Priority | Active System |
|---|---|---|---|---|
| 1 | 0 | 0 | 0 | GNSS/WTX |
| 2 | 0 | 0 | 1 | GNSS |
| 3 | 0 | 1 | 0 | WTX |
| 4 | 0 | 1 | 1 | GNSS |
| 5 | 1 | 0 | 0 | GNSS |
| 6 | 1 | 0 | 1 | GNSS |
| 7 | 1 | 1 | 0 | WTX |
| 8 | 1 | 1 | 1 | GNSS |

Scenario 1 shows that no transmissions are being received by the wireless networking system 112 ("WTX"), and the GNSS system 110 has no priority requirement. In this scenario, the GNSS system 110 can operate in ON/OFF mode at the interval of its choosing.

In scenario 2, the GNSS system 110 requests priority for a duration of time. The wireless networking system 112 can modify its operation to accommodate the priority request.

In scenario 3, S1 216 is asserted indicating that the wireless networking system 112 requires priority. There is no priority request from the GNSS system 110. Consequently, the transmitter 206 is active for the duration of any required transmissions.

In scenario 4, the GNSS system 110 takes priority, because the priority 220 signal is asserted. In this case, the wireless networking system 112 is requested to minimize its interference with navigation signal reception.

In scenario 5, the wireless networking system 112 is receiving (S2 218 is asserted), therefore, the GNSS system 110 can be active. In an embodiment in which the GNSS system 110 and the wireless networking system 112 share a resource, for example receivers 204 and 214 share correlators, some or all of the shared correlators can be allocated to the receiver 204 for processing of network signals.

In scenario 6, the GNSS system 110 has priority because the priority 220 signal is asserted.

In scenario 7, wireless networking system 112 gets priority. Scenario 7, where both S1 216 and S2 218 are asserted, may occur if the wireless networking system 112 is transmitting, while at the same time another device 102, 106, 108 in the wireless network 100 is transmitting not knowing that wireless networking system 112 initiated transmission.

In scenario 8, GNSS system 110 gets priority because the priority 220 signal is asserted. Accordingly, wireless networking system 112 transmissions are managed to minimize interference.

As previously noted, the wireless networking system 112 can also indicate its operation frequency/band (or carrier frequency) to the GNSS system 110. The GNSS system 110 can use this information to further mitigate interference.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
   determining whether a wireless transmitter in a mobile wireless device has data to transmit;
   asserting a first interference level signal provided to a global navigation satellite system ("GNSS") receiver in the mobile wireless device by the wireless transmitter if the wireless transmitter has data to transmit;
   controlling the processing of navigation signals in the GNSS receiver based, at least in part, on the assertion of the first interference level signal by the wireless transmitter;
   determining the location of the GNSS receiver based on the navigation signal processing; and
   asserting a priority signal provided by the GNSS receiver to the wireless transmitter if the processing of navigation signals in the GNSS receiver takes precedence over wireless transmitter transmissions.

2. The method of claim 1, further comprising:
   asserting a second interference level signal provided to the GNSS receiver by a wireless network receiver in the mobile wireless device if a wireless transmitter not colocated in the mobile device with the GNSS receiver is transmitting; and
   controlling the processing of navigation signals in the GNSS receiver based on the assertion of the second interference level signal by the wireless network receiver.

3. The method of claim 2, further comprising allocating a hardware resource shared by the GNSS receiver and the wireless network receiver colocated in the mobile device to one of the GNSS receiver and the wireless network receiver based, at least in part, on the second interference signal.

4. The method of claim 1, further comprising discontinuing processing of navigation signals in the GNSS receiver when the first interference level signal is asserted.

5. The method of claim 1, further comprising applying an interference mitigation technique in the GNSS receiver to reduce the effects of the wireless transmitter transmissions on the navigation signals when the first interference level signal is asserted.

6. The method of claim 1, further comprising improving navigation signal fidelity when the priority signal is asserted by one of reducing wireless transmitter transmission power and increasing wireless transmitter idle time relative to wireless transmitter active time.

\* \* \* \* \*